United States Patent [19]

Burkett et al.

[11] Patent Number: 5,539,078

[45] Date of Patent: Jul. 23, 1996

[54] PROCESS FOR MANUFACTURING POLYESTER COPOLYMERS

[75] Inventors: Eugene J. Burkett, Scott Depot, W. Va.; Douglas D. Callander, Akron, Ohio; Joseph Galko, Akron, Ohio; Edwin A. Sisson, Akron, Ohio

[73] Assignee: Shell Oil Company, Houston, Tex.

[21] Appl. No.: 355,945

[22] Filed: Dec. 14, 1994

[51] Int. Cl.$^6$ ............................................. C08G 63/78
[52] U.S. Cl. ........................ 528/277; 528/271; 528/272
[58] Field of Search ................................. 528/271, 272, 528/277

[56] References Cited

U.S. PATENT DOCUMENTS

| | | |
|---|---|---|
| 3,697,579 | 10/1972 | Balint et al. . |
| 4,020,049 | 4/1977 | Rinehart . |
| 4,079,046 | 3/1978 | Brignac et al. . |
| 4,447,595 | 5/1984 | Smith et al. . |
| 5,101,008 | 3/1992 | Cooke et al. . |

*Primary Examiner*—James J. Seidleck
*Assistant Examiner*—Terressa Mosley
*Attorney, Agent, or Firm*—Kim Muller

[57] ABSTRACT

This invention is an improved process for producing polyester copolymers, which employs a combination of an acid-based process and an ester-based process. The ester-based process is used to manufacture a low molecular weight naphthalate-based polymer, and the acid-based process is used to manufacture phthalate-based oligomers. The low molecular weight naphthalate-based polymer is combined with the phthalate-based oligomers, or the raw materials used to form the phthalate-based oligomers, to form a random polyester copolymer. Specifically, the process of the invention may be employed to manufacture, in an ester-based process, a low molecular weight polyethylene naphthalate polymer, which is then combined with polyethylene terephthalate oligomers produced in an acid-based process, and the acid-based process is then used to continue the polymerization reaction. Ester interchange reactions and further polymerization result in the production of a random polyethylene terephthalate/naphthalate copolymer.

11 Claims, No Drawings

PROCESS FOR MANUFACTURING POLYESTER COPOLYMERS

FIELD OF THE INVENTION

This invention relates to a process for manufacturing a linear random polyester copolymer. More particularly, this invention relates to a process for manufacturing a polyethylene terephthalate/naphthalate, or PET/N copolymer.

BACKGROUND OF THE INVENTION

As known to those skilled in the art, linear polyesters are generally made in two stages. In the first stage, called the esterification or transesterification stage, a dicarboxylic acid or diester is reacted with a diol at elevated temperatures and at either atmospheric or elevated pressures. In this first stage water or the corresponding alcohol is produced as a byproduct. In the second or polycondensation stage, a vacuum is gradually applied, one or more catalysts are utilized, and additional water along with excess diol are withdrawn as condensation byproducts. This two-stage process is generally conducted in the melt phase, until the intrinsic viscosity of the polymer reaches about 0.2 dl/g or higher, for example, up to about 0.6 dl/g. At this point, the molten polymer is rapidly cooled to produce a solid polymer which is then pelletized, chopped, etc. Various polyesters can be made by such polymerization techniques, including polyethylene terephthalate (PET), and various copolymers thereof.

To produce crystallizable copolymers with high molecular weights and high melting points, such as those suitable for use as bottle resins, the pelletized product of the melt phase process is subsequently subjected to solid state polymerization at a temperature below the melting point of the partially formed polymer, and in the presence of a vacuum or a nitrogen purge to remove reaction byproducts. The polymer is actually polymerized in a solid state, with the polycondensation reaction being continued in such a state. Solid state polymerization is continued until the intrinsic viscosity of the polymer reaches any desired level, such as from about 0.6 dl/g to about 1.0 dl/g or even higher. Desirably, the intrinsic viscosity ranges from about 0.70 dl/g to about 0.90 dl/g.

Two major commercial processes are used to produce high molecular weight linear polyesters. These two processes are the ester-based process and the acid-based process, which react a diester and a diacid, respectively, with one or more diols. For example, in the production of high molecular weight polyethylene terephthalate, the dimethyl ester of terephthalic acid is heated with an excess of ethylene glycol in the presence of an ester interchange catalyst at a temperature of about 185° C. to about 220° C. under atmospheric pressure until approximately the theoretical amount of methyl alcohol has been liberated. The excess glycol is then distilled off and the product remaining, which is the bis glycol ester, is polymerized by condensation. Glycol is eliminated by heating the bis glycol ester with a catalyst at elevated temperatures and under reduced pressures until a high molecular weight product is formed.

High molecular weight polyesters can also be produced on a commercial scale by an acid-based process. Polyethylene terephthalate, for example, can be produced by heating terephthalic acid with ethylene glycol to form a mixture of low molecular weight oligomers, which can then be polycondensed by heating in the presence of a catalyst at a temperature of about 260° C. to about 300° C. under reduced pressures to form a high molecular weight product. The acid-based process is currently preferred for commercial operations.

The acid-based process has many advantages, both technical and economical. The free acids are less expensive than dialkyl esters of acids. There is no lower alkyl alcohol byproduct, and since the excess of diol used is kept at a minimum, recovery and losses of diol are considerably reduced. No transesterification catalyst is required, while reaction rates are rapid, and complete reaction from raw material to high polymer may be carried out in as little as three hours. Furthermore, polyesters formed by this method may attain intrinsic viscosities which are somewhat higher than those normally obtained by the ester interchange route. In addition to these advantages, the polyester product may contain less catalyst residue than polyester resin formed by the ester-based process. Although no catalyst is necessary in the initial esterification reaction, a catalyst such as zinc acetate, manganese acetate, or alkali metal alcoholates may be employed. The only catalyst actually necessary is a condensation catalyst, which may suitably be antimony trioxide, zinc borate, litharge, lead acetate, magnesium oxide, or other condensation catalyst.

Polyester copolymers are generally prepared by combining one or more dicarboxylic acids with one or more diols, or by combining one or more diesters of dicarboxylic acids with one or more diols. A polyethylene terephthalate/naphthalate copolymer, for example, may be made by combining dimethyl terephthalate, dimethyl-2,6-naphthalene-dicarboxylate, and ethylene glycol. It is also desirable to prepare such copolymers through a combination of terephthalic acid, 2,6-naphthalene dicarboxylic acid, and ethylene glycol. However, 2,6-naphthalene dicarboxylic acid, with a purity sufficient to produce high molecular weight polyester, is not currently commercially available, while its diester equivalent, dimethyl-2,6-naphthalene-dicarboxylate, is commercially available. Consequently, manufacturers that employ an ester-based process can more readily make a polyester copolymer containing both phthalate-based units and naphthalate-based units.

The conventional ester-based process to make polyethylene naphthalate (PEN) polymers employs dimethyl-2,6-naphthalene-dicarboxylate, ethylene glycol, and a catalyst, such as a manganese catalyst in the transesterification step. The presence of acidic impurities, such as the presence of terephthalic acid, would poison the catalyst, significantly reducing its activity. Thus, the presence of an acidic component would inhibit the formation of, for example, bis-(2-hydroxy-ethyl)-2,6-naphthalate, the transesterification product of dimethyl-2,6-naphthalene-dicarboxylate and ethylene glycol. It is important that all the methyl groups of dimethyl-2,6-naphthalene-dicarboxylate are completely exchanged with hydroxyethyl groups, since any residual methyl end groups will not be removed during the subsequent polycondensation reaction and will act as "dead ends" on the polymer chains, thus limiting the attainable molecular weight and rate of the melt and solid state polymerization steps.

It is an objective of this invention to provide an improved process for producing polyester copolymers. It is an objective of this invention to allow a manufacturer who employs an acid-based process for the manufacture of polyester polymers, to utilize a combination of a diester of a dicarboxylic acid and a dicarboxylic acid to prepare a polyester copolymer. It is a further objective of this invention to allow the production of a PET/N copolymer through a combination of terephthalic acid, dimethyl-2,6-naphthalene-dicarboxylate, and ethylene glycol.

Other objectives of the invention will be evident from the detailed description of the invention.

SUMMARY OF THE INVENTION

The subject invention is an improved process for the manufacture of polyester copolymers, wherein a combination of an acid-based process and an ester based process is used to make random copolymers containing phthalate-based units and naphthalate-based units. More specifically, the subject invention is an improved process for manufacturing, for example, a polyethylene terephthalate/naphthalate, or PET/N copolymer.

In this invention, the product of the ester-based process is combined with the product of the acid-based process, or simply added with raw materials utilized in the acid-based process, to form a polyester copolymer. More specifically, a low molecular weight naphthalate-based polymer is combined with phthalate-based oligomers. Preferably, the low molecular weight naphthalate-based polymer is added to the initial stage of an acid-based polymer process, and polymerization is continued to produce a polyester copolymer. Alternatively, the low molecular weight naphthalate-based polymer is added to phthalate-based oligomers after the initial esterification stage, and polymerization is continued to produce a polyester copolymer. For example, a low molecular weight PEN polymer is combined with terephthalic acid and ethylene glycol to form a PET/N copolymer. As an alternative, a small portion of a low molecular weight PEN polymer is added to PET oligomers, and polymerization is continued to produce a PET/N copolymer.

The subject invention also includes polyester copolymer products of the process described above. A PET/N copolymer containing carboxylate monomer units that are from 85 mole percent to 99 mole percent terephthalate-based and 15 mole percent to 1 mole percent naphthalate-based, based on total moles of carboxylate units, is preferred, and a PET/N copolymer containing carboxylate monomer units that are from 90 mole percent to 98 mole percent terephthalate-based and 10 mole percent to 2 mole percent naphthalate-based, based on total moles of carboxylate units, is particularly preferred. These ranges define compositions that are crystallizable and yield improved strength on orientation at temperatures above the glass transition temperature of the composition.

DETAILED DESCRIPTION OF THE INVENTION

This invention is applicable to the preparation of polyester copolymers from various combinations of dicarboxylic acids, alkyl esters of dicarboxylic acids, and diols. A combination of an acid-based process and an ester-based process is employed in this invention to manufacture polyester copolymers.

In one embodiment of the invention, an alkyl diester of a naphthalene dicarboxylic acid and a diol are combined in an ester-based process to manufacture a low molecular weight naphthalate-based polymer product with a degree of polymerization between about 20 and about 100, and preferably between about 25 and about 100. This naphthalate-based product may be stored for later use, or provided directly to the acid-based process. An aromatic dicarboxylic acid, a diol and the naphthalate-based product are combined in an acid-based process, where esterification and ester interchange reactions and further polymerization result in a random polyester copolymer.

More preferably, dimethyl-2,6-naphthalene-dicarboxylate and ethylene glycol are combined in an ester-based process to manufacture a low molecular weight PEN polymer, having an intrinsic viscosity of from about 0.15 dl/g to about 0.45 dl/g and a number average molecular weight of from about 4800 to about 24,200, and preferably from about 6050 to about 24,200. Then terephthalic acid, ethylene glycol, and the low molecular weight PEN polymer are combined in an acid-based process, where esterification and ester interchange reactions and further polymerization result in a random PET/N copolymer.

The random polyester copolymer prepared from a combination of dimethyl-2,6-naphthalene-dicarboxylate, ethylene glycol, and terephthalic acid may be represented by the following structural formula:

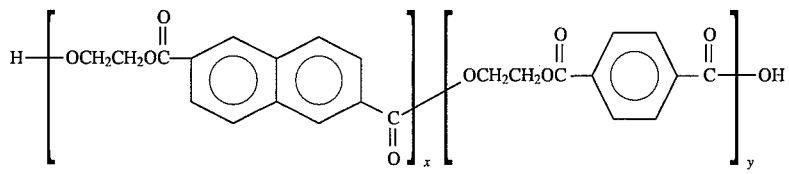

where x=mole fraction naphthalate-based units and y=mole fraction terephthalate-based units, based upon total moles of carboxylate units.

In another embodiment of the invention, an aromatic dicarboxylic acid and a diol are combined in an acid-based process to manufacture, for example, a phthalate-based product, preferably phthalate-based oligomers with a degree of polymerization of from 1.4 to 10 and preferably 1.6 to 5. The phthalate-based oligomers have both acid and hydroxyl ends on the oligomer chains. Separately, an alkyl diester of a naphthalene dicarboxylic acid and a diol are combined in an ester-based process to manufacture a naphthalate-based product, preferably a low molecular weight naphthalate-based polymer with a degree of polymerization between about 20 and about 100, and preferably between about 25 and about 100. This naphthalate-based product may be stored for later use, or provided directly to the acid-based process. The naphthalate-based product is combined with the phthalate-based product in the acid-based process, where esterification and ester interchange reactions and further polymerization result in a random polyester copolymer.

More preferably, terephthalic acid and ethylene glycol are combined in an acid-based process to produce PET oligomers. Such PET oligomers have a degree of polymerization of from about 1.4 to 10 monomer units, and preferably 1.4 to 5 monomer units, and a number average molecular weight of from about 300 to about 2000, and preferably from about 300 to about 1000. Separately, dimethyl-2,6-naphthalenedicarboxylate and ethylene glycol are combined in an ester-based process, resulting in a low molecular weight PEN polymer having an intrinsic viscosity of from about 0.15 dl/g to about 0.45 dl/g and a number average molecular weight of from about 4800 to about 24,200, and preferably about 6050 to about 24,200. The low molecular weight PEN polymer is then added to the PET oligomers in the acid-based process, where esterification and ester interchange reactions and further polymerization result in a random PET/N copolymer.

Representative examples of acids which can be used in this invention are linear dicarboxylic acids having from about 2 to about 16 carbon atoms. Specific examples of such alkyl dicarboxylic acids include oxalic acid, malonic acid, succinic acid, glumtic acid, adipic acid, pimelic acid, suberic acid, azelaic acid, sebacic acid, and the like. Preferably, the acids are aromatic acids or alkyl-substituted aromatic acids containing from about 8 to about 16 carbon atoms. Specific examples of such aromatic acids include the various isomers of phthalic acid (orthophthalic acid, metaphthalic or isophthalic acid, and paraphthalic or terephthalic acid), and the various isomers of dimethylphthalic acid (dimethylisophthalic acid, dimethylorthophthalic acid, and dimethylterephthalic acid). Naphthalie acids are specifically excluded, since the naphthalate-based component of the polymers of the invention is provided in the form of an ester. Terephthalic and isophthalic acid are the preferred acids, and a combination of terephthalic acid and isophthalic acid, wherein isophthalic acid is a minor acid component, is particularly preferred.

Representative examples of the diesters used in this invention are the alkyl diesters of the naphthalene dicarboxylic acids which include 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid and 2,7-naphthalene dicarboxylic acid. Preferably, the alkyl radicals bonded to the oxygen atoms of the diester molecule contain 1 to 6 carbon atoms. Such alkyl radicals may be the same or different, and may be linear or branched. Suitable alkyl radicals include methyl, ethyl, propyl, isopropyl, n-butyl, iso-butyl, tert-butyl, n-pentyl, and n-hexyl. Diesters of phthalic acids are specifically excluded, since the phthalic-based component of the polymers of the invention is provided in the form of an acid. Diesters of 2,6-naphthalene dicarboxylic acid are the preferred esters for use in this invention, and dimethyl-2,6-napthalene-dicarboxylate is particularly preferred.

Representative examples of the diols which can be used in this invention are linear and branched alkyl diols having from about 2 to about 10 carbon atoms. Specific examples include ethylene glycol (1,2-ethanediol), propylene glycol (e.g. 1,3-propanediol), trimethylene glycol, butylene glycol (e.g. 1,4-butanediol), and neopentyl glycol. Ethylene glycol, propylene glycol, and butylene glycol are preferred, and ethylene glycol is particularly preferred.

The molecular weight of a polymer is a measure of the average weight of the molecular chains in the mixture of different-sized molecular chains that make up the polymer. The number average molecular weight is based upon the sum of the number fractions for the weight of each size of molecular chain present in the polymer. The number average molecular weight for the polymers of the invention may be determined by end-group titration or gel-permeation chromatography, using conventional methods.

Intrinsic viscosity is frequently utilized as an indication of the molecular weight of polyester polymers. The intrinsic viscosity of a polymer is determined by plotting the reduced or inherent viscosity of a series of polymer solutions with various polymer concentrations against the polymer concentration in the various solutions. Extrapolation of the plot to zero concentration yields the intrinsic viscosity of the polymer. For purposes of this invention, intrinsic viscosity (measured in dl/g) is determined in a 60:40 phenol:tetrachloroethane mixed solvent solution at 30° C.

Another expression related to molecular weight is the degree of polymerization. This refers to the number of monomer molecules that combine to form a single polymer molecule. The degree of polymerization is estimated by dividing the number average molecular weight of the polymer by the molecular weight of the polymer repeat unit.

The operating conditions for the acid-based and ester-based polymerization processes described herein are generally known to those skilled in the art of preparing polyester polymers and copolymers.

The temperature used for the esterification or transesterification reactions is from about 150° C. to about 300° C., depending upon the monomer units present, and is preferably operated in the range of from about 200° C. to about 280° C. The pressure used for the esterification or transesterification reactions will vary with the temperature used, and generally will be at least as high as the vapor pressure of the most volatile glycol in the reaction mixture at the temperature used. The pressure used will be less than the vapor pressure of water at the temperature at which the reaction is occurring. Thus the pressure can suitably be from about 20 to about 1000 pounds per square inch gauge (psig) and is preferably operated in the range of from about 30 to about 100 psig.

The temperature used for the polycondensation reaction is from about 250° C. to about 295° C., depending upon the monomer units present, and is preferably operated in the range of 265° C. to 285° C. The pressure used for the polycondensation reaction is gradually reduced over the course of the reaction, from atmospheric pressure to a high vacuum of less than 1 torr. The reaction employs a polycondensation catalyst, which may suitably be antimony trioxide, zinc borate, litharge, lead acetate, magnesium oxide, or the like.

It may be desirable to prepare the low molecular weight naphthalate-based polymer and place it in intermediate storage for later use. To avoid the expense of storing the molten polymer at an elevated temperature, it is preferable to first cool and solidify (e.g. pelletize) the polymer prior to storage. If the low molecular weight naphthalate-based polymer has been cooled and solidified for storage, it must be exposed to a temperature sufficient to solubilize the polymer in order to effectively combine it with the aromatic dicarboxylic acid and diol (or phthalate-based oligomers) through ester interchange reactions. Heating the polymer to a temperature above its melting point will facilitate its copolymerization with the aromatic dicarboxylic acid and diol (or phthalate-based oligomers) through ester interchange reactions. For the low molecular weight PEN polymer, this melting point is about 265° C. Smaller particle sizes will also facilitate dissolution and copolymerization.

When the low molecular weight PEN polymer is combined with terephthalic acid and ethylene glycol, its melting point is exceeded as the esterification reaction proceeds. The subsequent polycondensation conditions ensure efficient transesterification and production of the PET/N copolymer. When the low molecular weight PEN is added to PET oligomers formed after the initial esterification reaction, its melting point is exceeded in the early stages of the polycondensation reaction, again ensuring efficient transesterification and production of the PET/N copolymer.

The acid-based process for melt polymerization is preferably carried out with the use of a "heel." The heel is an esterification product recycled to the initial stages of the esterification reaction to increase the solubility of the dicarboxylic acid, thereby increasing the reaction rate of the dicarboxylic acid and the diol. The use of a heel is explained in U.S. Pat. No. 4,020,049 (Rinehart), and may be applied to both continuous and batch manufacturing processes.

In this invention, a heel is advantageously used in either of the two embodiments described above. For example, when terephthalic acid, ethylene glycol, and the low molecular weight PEN polymer product are combined in the acid-based polymer process, the reactor in which these materials are combined may contain a heel of preformed PET oligomers to facilitate dissolution of the terephthalic acid. Also, for example, when terephthalic acid and ethylene glycol are combined to form the PET oligomers, the reactor in which these materials are combined may contain a heel of preformed PET oligomers.

A diester, as defined for this invention, is not employed in preparing such a heel. The naphthalate-based component of the polymers of the invention is relatively small on a weight percent basis, and consequently would be too small to serve as the heel described in U.S. Pat. No. 4,020,049.

The molecular weight of the polymers produced by the process of this invention may be increased by polymerization in the solid state. The solid state polycondensation reaction is conducted at temperatures from about 190° C. to about 250° C., in the presence of an inert gas (e.g. nitrogen). The inert gas serves to remove reaction byproducts, such as excess diol and water. The solid state polymerization reaction is generally continued until the polymer reaches an intrinsic viscosity of 0.7 dl/g or more.

The polyester copolymer produced in the melt polymerization process preferably contains a carboxyl content that provides an enhanced solid state polymerization rate. A method for producing polyester polymers with an optimum carboxyl content is described in U.S. Pat. No. 4,238,593 (Duh).

Polyester copolymers can be prepared with a wide variety of characteristics which make such polymers useful for a wide variety of applications. A PET/N copolymer, for example, exhibits improved gaseous barrier, greater UV absorption and chemical resistance, and higher temperature properties relative to a PET polymer, yet may be more economic than a PEN homopolymer. Such PET/N copolymers are particularly useful for making fibers, films, and food and beverage packaging articles. "Hot fill" and "returnable, reuseable" containers may require the thermal properties of a polyester copolymer such as a PET/N copolymer. Copolymers containing carboxylate monomer units that are from 90 mole percent to 98 mole percent terephthalate-based and 10 mole percent to 2 mole percent naphthalate-based, based on total moles of carboxylate units, are particularly useful for such applications.

The process of the invention is illustrated by the following illustrative and comparative examples.

Illustrative Example 1

A low molecular weight PEN polymer was prepared in the following manner. An oil-jacketed stainless steel reactor (100 gallon capacity) preheated to 190° C. was charged with 138.6 pounds of dimethyl-2,6-naphthalene-dicarboxylate, 77.5 pounds of ethylene glycol, and a manganese transesterification catalyst. Mechanical agitation was initiated and the reactor oil temperature increased over the next hour to 220° C. The transesterification reaction, carried out under atmospheric pressure, was completed in about 2.5 hours, during which time 34 pounds of by-product methanol were collected. The transesterification product had a final temperature of 209° C. The reactor contents were then transferred to a second oil-jacketed stainless steel reactor (70 gallon capacity) preheated to 270° C. To the contents of the second reactor, held at atmospheric pressure under mechanical agitation, a manganese catalyst deactivator/stabilizer formulation and an antimony polycondensation catalyst were added. The reactor was then sealed, the oil temperature increased to 275° C., and the reactor pressure reduced at a controlled rate to about 5.0 torr. The polycondensation reaction cycle totalled about 1.5 hours. The polycondensation product had a final temperature of 261° C. The reactor contents were then extruded onto a moving casting belt to form a ribbon which was then cooled, solidified, broken into pieces, and ground into a fine powder. This reaction produced 140 pounds of PEN having an IV of 0.17 dl/g and a melting point ($T_m$) of 265° C. This low molecular weight PEN was subsequently used as one of the starting materials for the reactions described in Examples 2 and 3.

Illustrative Example 2

A polyester copolymer containing 98 mole percent terephthalate units and 2 mole percent naphthalate units, based upon total moles of carboxylate units, was prepared in the following manner. An oil-jacketed stainless steel reactor (100 gallon capacity), preheated to 260° C., held about 260 pounds of a PET oligomer "heel" at atmospheric pressure under mechanical agitation. The heel, prepared by reaction of terephthalic acid and ethylene glycol, was utilized to facilitate solubilizing the terephthalic acid. The reactor was charged with 126.4 pounds of terephthalic acid and 10.3 pounds of the low-IV PEN polymer of Example 1. The reactor was then sealed, pressurized to 30 psig with nitrogen gas, and charged with 50.1 pounds of ethylene glycol and an additive formulation. The amount of low molecular weight PEN polymer added was sufficient to adjust the entire contents of the reactor (the heel as well as the terephthalic acid and ethylene glycol added) to contain 2 mole percent naphthalate, based on total moles of carboxylate units. The reactor oil temperature was increased to 285° C., and the reaction pressure was increased to 70 psig.

Over the last hour of the esterification, the pressure was reduced at a controlled rate to 10 psig. The total esterification reaction cycle was completed in about 2.0 hours during which time 27 pounds of by-product water were collected. The esterification hours product had a final temperature of 276° C. Then, 150 pounds of the reactor contents were transferred to a second oil-jacketed stainless steel reactor (70 gallon capacity) preheated to 275° C. While the contents of the second reactor were held at atmospheric pressure under mechanical agitation, an additive formulation and an antimony polycondensation catalyst were added to the reactor. The reactor was then sealed and the pressure reduced at a controlled rate over a period of about 1.1 hours to about 2.5 torr. The intermediate polycondensation product had a final temperature of 265° C. The reactor contents were then transferred to a third oil-jacketed stainless steel reactor (77 gallon capacity) preheated to 275° C. After increasing the oil temperature to 280° C. and obtaining an ultimate vacuum of about 0.3 torr, the polycondensation was continued for about 1.4 hours until the agitator torque reached a predetermined target of 2.4 kilowatts at 30 rpm. This final polycondensation product had a final temperature of 280° C. The reactor contents were then extruded through a die to form strands that were cooled in a water bath and pelletized. This reaction produced 157 pounds of polyethylene(terephthalate)$_{0.98}$(naphthalate)$_{0.02}$ copolymer having the following properties: IV=0.59 dl/g, T$_m$=250.0° C., glass transition temperature (T$_g$)=77.9° C., and color values R$_d$=35.4 and b=3.3.

Illustrative Example 3

A polyester copolymer containing 95 mole percent terephthalate units and 5 mole percent naphthalate units, based on total moles of carboxylate units, was prepared in the following manner. About 260 pounds of a PET oligomer "heel" was held at atmospheric pressure under mechanical agitation in an oil-jacketed stainless steel reactor (100 gallon capacity) preheated to 265° C. The heel, prepared by reaction of terephthalic acid and ethylene glycol, was utilized to facilitate solubilizing the terephthalic acid. The reactor was then charged with 107.7 pounds of terephthalic acid and 25.5 pounds of the low molecular weight PEN polymer of Example 1. The reactor was then sealed, pressurized to 30 psig with nitrogen gas, and charged with 43.2 pounds of ethylene glycol and an additive formulation. The amount of low molecular weight PEN polymer added was sufficient to adjust the entire contents of the reactor (the heel as well as the terephthalic acid and ethylene glycol added) to contain 5 mole percent naphthalate, based on total moles of carboxylate units. The reactor oil temperature was increased to 285° C., and the reactor pressure was increased to 70 psig. Over the last hour of the esterification reaction, the pressure was reduced at a controlled rate to 10 psig. The total esterification reaction cycle was completed in about 2.0 hours, during which time 23 pounds of by-product water were collected. The esterification product had a final temperature of 276° C. Then 150 pounds of the reactor contents were transferred to a second oil-jacketed stainless steel reactor (70 gallon capacity) preheated to 275° C. While the contents of the second reactor were held at atmospheric pressure under mechanical agitation, an additive formulation and an antimony polycondensation catalyst were added to the reactor. The reactor was then sealed and the pressure reduced at a controlled rate over a period of about 1.1 hours to about 2.5 torr. The intermediate polycondensation product had a final temperature of 265° C. The reactor contents were then transferred to a third oil-jacketed stainless steel reactor (77 gallon capacity) preheated to 275° C. After increasing the oil temperature to 280° C. and obtaining an ultimate vacuum of about 0.3 torr, the polycondensation was continued for about 1.3 hours until the agitator torque reached a predetermined target of 2.4 kilowatts at 30 rpm. This final polycondensation product had a final temperature of 280° C. The reactor contents were then extruded through a die to form strands that were cooled in a water bath and pelletized. This reaction produced 144 pounds of polyethylene(terephthalate)$_{0.95}$(naphthalate)$_{0.05}$ copolymer having the following properties: IV=0.58 dl/g, T$_m$=242.6° C., T$_g$=79.6° C., and color values R$_d$=33.1 and b=3.5.

Illustrative Example 4

A portion of the copolymer produced as described in Illustrative Example 3 was polymerized in the solid state by heating under high vacuum in a rotating reactor at temperatures from about 220° C. to about 225° C. until the IV had increased to about 0.85 dl/g. Maintaining the dry condition of the polymer, it was transferred to a Nissei 50-T single cavity blow molding unit and conventionally processed into 16 oz. biaxially oriented bottles with acceptable visual clarity and color, and suitable physical properties. The container was evaluated for oxygen barrier, and exhibited an oxygen transmission rate of 6.0 cm$^3$/100 in$^2$/mil/day.

The following comparative examples illustrate use of the conventional ester based process to prepare PET/N copolymers.

Comparative Example 1

A polyester copolymer containing 98 mole percent terephthalate units and 2 mole percent naphthalate units was prepared using a conventional ester-based process in the following manner. An oil-jacketed stainless steel reactor (100 gallon capacity) preheated to 180° C. was charged with 147.8 pounds of dimethyl terephthalate, 3.8 pounds of dimethyl-2,6-naphthalene-dicarboxylate, 106.6 pounds of ethylene glycol, and a manganese transesterification catalyst. Once the melt temperature reached 140° C., mechanical agitation was initiated. When the melt temperature reached 155° C., the reactor oil temperature was increased at a controlled rate over the next 1.7 hours to 230° C. The transesterification reaction cycle, carried out under atmospheric pressure, was completed in 3.2 hours, during which time 37 pounds of by-product methanol were collected. The transesterification product had a final temperature of 220° C. The reactor contents were then transferred to a second oil-jacketed stainless steel reactor (70 gallon capacity), and held at atmospheric pressure under mechanical agitation, while a stabilizer formulation and an antimony polycondensation catalyst were added. The reactor was then sealed, the oil temperature raised to 275° C., and the pressure reduced at a controlled rate over a period of about 1.5 hours to about 3.4 torr. The intermediate polycondensation product had a final temperature of 254° C. The reactor contents were then transferred to a third oil-jacketed stainless steel reactor (77 gallon capacity) preheated to 280° C. After obtaining an ultimate vacuum of about 0.8 torr, the polycondensation reaction was continued for about 2.2 hours until the agitator torque reached a predetermined target of 2.7 kilowatts at 30 RPM. The final polycondensation product had a final temperature of 280° C. The reactor contents were then extruded through a die to form strands that were cooled in a water bath and pelletized. This reaction produced 147 pounds of polyethylene(terephthalate)$_{0.98}$(naphthalate)$_{0.02}$ copolymer having the following properties: IV=0.58 dl/g, T$_m$=255.5° C., T$_g$=81.6° C., and color values R$_d$=31.7 and b=4.1.

Comparative Example 2

A polyester copolymer containing 95 mole percent terephthalate units and 5 mole percent naphthalate units was prepared in the following manner. An oil-jacketed stainless steel reactor (100 gallon capacity) preheated to 180° C. was charged with 142.1 pounds of dimethyl-terephthalate, 9.4 pounds of dimethyl-2,6-naphthalene-dicarboxylate, 105.2 pounds of ethylene glycol, and a manganese transesterification catalyst. Once the melt temperature reached 140° C., mechanical agitation was initiated. When the melt temperature reached 155° C., the reactor oil temperature was increased at a controlled rate over the next 1.7 hours to 230° C. The transesterification reaction cycle, carried out under atmospheric pressure, was completed in 3.5 hours, during which time 47 pounds of by-product methanol were collected. The transesterification product had a final temperature of 216° C. The reactor contents were then transferred to a second oil-jacketed stainless steel reactor (70 gallon capacity) preheated to 250° C. To the contents of the second reactor, held at atmospheric pressure under mechanical agitation, a stabilizer formulation and an antimony polycondensation catalyst were added. The reactor was then sealed, the oil temperature raised to 275° C., and the pressure reduced at a controlled rate over a period of about 1.6 hours to about 2.7 torr. The intermediate polycondensation product had a final temperature of 254° C. The reactor contents were then transferred to a third oil-jacketed stainless steel reactor (77 gallon capacity) preheated to 280° C. After obtaining an ultimate vacuum of about 0.8 torr, the polycondensation was continued for about 2.0 hours until the agitator torque reached a predetermined target of 2.7 kilowatts at 30 RPM. The final polycondensation product temperature was 280° C. The reactor contents were then extruded through a die to form strands that were cooled in a water bath and pelletized. This reaction produced 152 pounds of polyethylene(terephthalate)$_{0.95}$(naphthalate)$_{0.05}$ copolymer having the following properties: IV=0.61 dl/g, $T_m$=248.8° C., $T_g$=82.1° C., and color values $R_d$=28.4 and b=2.9.

While certain representative embodiments and details have been shown for the purpose of illustrating the invention it will be apparent to those skilled in the art that various changes and modifications may be made therein without departing from the spirit or scope of the invention.

We claim:

1. A process for manufacturing a random polyester copolymer comprising:

contacting an alkyl diester of a naphthalene dicarboxylic acid with a first alkyl diol and a suitable transesterification catalyst under transesterification conditions to form a bis(hydroxyalkylnaphthalate) and subsequently deactivating the transesterification catalyst;

contacting the bis(hydroxyalkylnaphthalate) and a suitable polycondensation catalyst under polycondensation conditions to form a low molecular weight naphthalate-based polymer product, wherein the naphthalate-based polymer product has a degree of polymerization of from about 20 to about 100;

combining the low molecular weight naphthalate-based polymer product, a phthalic acid, and a second alkyl diol under esterification conditions to form a random polyester copolymer product;

wherein the random polyester copolymer contains from about 85 mole percent to about 99 mole percent phthalate-based units and from about 1 mole percent to about 15 mole percent naphthalate-based units, based upon total moles of carboxylate units.

2. The process of claim 1 wherein the first alkyl diol is selected from the group consisting of ethylene glycol, propylene glycol, and butylene glycol, and mixtures thereof, and the second alkyl diol is selected from the group consisting of ethylene glycol, propylene glycol, and butylene glycol, and mixtures thereof.

3. The process of claim 2 wherein the first alkyl diol and the second alkyl diol are the same.

4. The process of claim 3 wherein the alkyl diester of naphthalene dicarboxylic acid is selected from the group consisting of alkyl diesters of 2,6-naphthalene dicarboxylic acid, and mixtures thereof.

5. The process of claim 4 wherein the first glycol and the second glycol are ethylene glycol.

6. The process of claim 5 wherein the phthalic acid is selected from the group consisting of orthophthalic acid, isophthalic acid, terephthalic acid, and mixtures thereof.

7. The process of claim 6 wherein the alkyl diester of 2,6-naphthalene dicarboxylic acid is dimethyl-2,6-naphthalene-dicarboxylate.

8. The process of claim 7 wherein the phthalic acid is terephthalic acid.

9. The process of claim 7 wherein the random polyester copolymer contains from about 90 mole percent to about 98 mole percent phthalate-based units and from about 2 mole percent to about 10 mole percent naphthalate-based units, based upon total moles of carboxylate units.

10. The process of claim 7 wherein the naphthalate-based polymer product is converted to solid form prior to combination with the phthalic acid and second alkyl diol.

11. A product of the process of claim 9 wherein the random polyester copolymer contains from about 95 mole percent to about 98 mole percent phthalate-based units and from about 2 mole percent to about 5 mole percent naphthalate-based units, based upon total moles of carboxylate units.

* * * * *